United States Patent [19]

Meurer et al.

[11] 4,148,206
[45] Apr. 10, 1979

[54] TUBE WELDING MACHINE WITH EXCHANGEABLE ROLLS

[75] Inventors: Hans Meurer, Monchen-Gladbach; Josef Jordans, Kleinenbroich; Gerhard Henreich, Viersen, all of Fed. Rep. of Germany

[73] Assignee: Mannesmann Aktiengesellschaft, Dusseldorf, Fed. Rep. of Germany

[21] Appl. No.: 864,772

[22] Filed: Dec. 27, 1977

[30] Foreign Application Priority Data

Dec. 29, 1976 [DE] Fed. Rep. of Germany ....... 2659763

[51] Int. Cl.² ............................................. B21B 31/08
[52] U.S. Cl. ........................................... 72/239; 72/179
[58] Field of Search ................. 72/238, 239, 179, 181, 72/247; 214/1 BB

[56] References Cited

U.S. PATENT DOCUMENTS

| 2,067,508 | 1/1937 | Smitmons | 72/238 X |
| 2,363,378 | 11/1944 | Young | 72/238 |
| 2,601,793 | 7/1952 | Wood | 72/238 |
| 3,589,161 | 6/1971 | Muffett | 72/238 |
| 3,699,796 | 10/1972 | Eibe et al. | 72/239 |
| 3,877,276 | 4/1975 | Petros | 72/238 |

FOREIGN PATENT DOCUMENTS 49-10425 7/1974 Japan ......................... 72/239

Primary Examiner—Milton S. Mehr
Attorney, Agent, or Firm—Smyth, Pavitt, Siegemund, Jones & Martella

[57] ABSTRACT

A roll stand for horizontally journalled contoured rolls is constructed to have two windows, through one of these windows driving engagement is made to the rolls and through the other one two subassemblies may be inserted or removed together from the stand. Each subassembly includes a pair of mounting blocks, a shaft and a roll on the shaft. The two subassemblies are axially locked together and/or independently to the stand, while one rests on the other or is suspended from adjustment spindles. The two subassemblies are removed from the stand together by a lifting fork, requiring only that the connection to the stand be released but leaving the two subassemblies interconnected.

10 Claims, 8 Drawing Figures

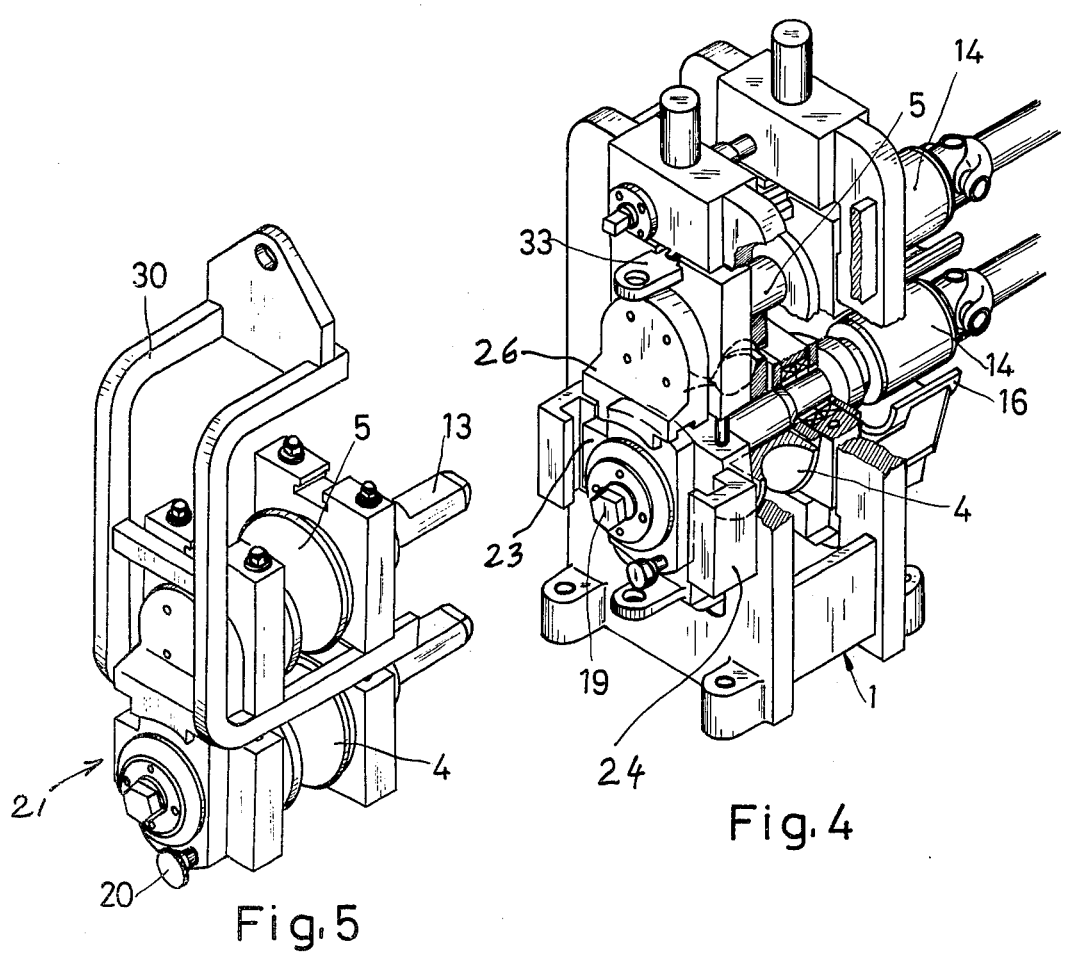

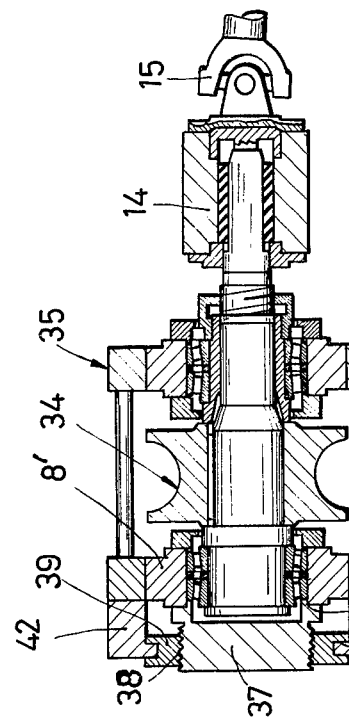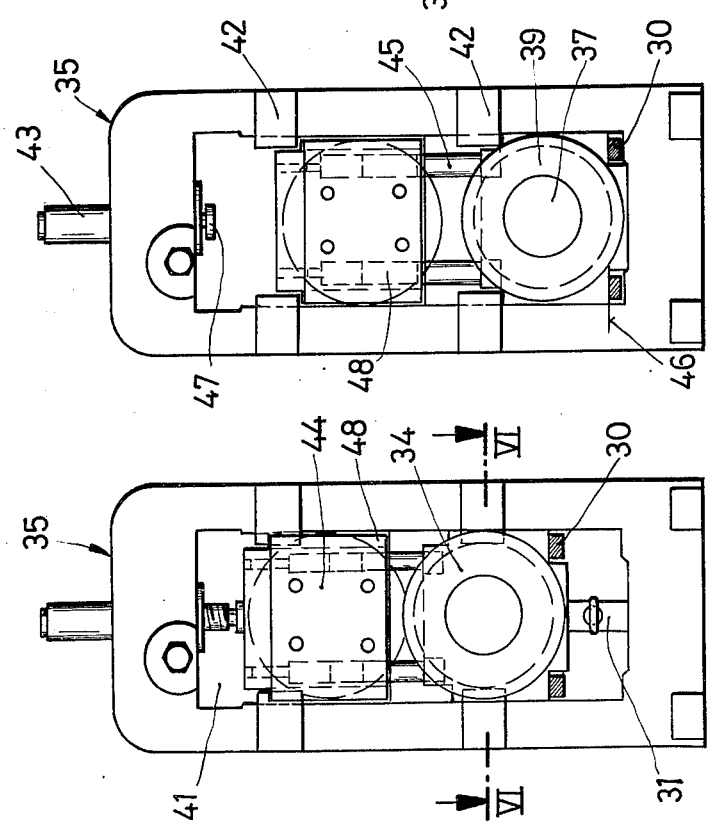

TUBE WELDING MACHINE WITH EXCHANGEABLE ROLLS

BACKGROUND OF THE INVENTION

The present invention relates to improvements in tube welding machines. Tube welding machines include a large number of individual roll stands wherein particularly contoured rolls, for example, pre-shape skelp into a split tube to be welded at the joint. The individual roll stands may, however, be required to process different types of skelp to obtain different diameter tubes to be welded. Therefore, it may be required to exchange the rolls in the individual stands. The present invention, therefore, relates particularly to improvements in the structure which permits the exchange of the rolls in individual stands as pertaining to a tube welding machine.

Known equipment of the type referred to above usually requires that the rolls in each stand are individually disconnected and removed from particular shafts or axles supporting the rolls. This operation is quite cumbersome and time consuming and requires well trained personnel because the work involved requires great skill. It was found, moreover that the exchange of rolls which are horizontally mounted pose particular difficulties, and in many tube welding machines the number of such stands is quite large.

In a completely different state of art, German Pat. No. 1,052,346 discloses subassemblies composed of shafts, mounting pieces and rolls. However, these particular subassemblies are, in fact, not suitable for use in rolling stands of the type customarily employed in tube welding machines, so that therefore these kind of subassemblies have not been used in tube welding machines and in roll stands in such machines.

DESCRIPTION OF THE INVENTION

It is an object of the present invention to improve tube welding machines as far as the roll stands in these machines is concerned and to provide particularly a construction which permits simple and ready exchange of the horizontally mounted rolls.

In accordance with the preferred embodiment of the present invention, it is suggested to provide subassemblies which consist of the rolls proper, roll mounting shafts and mounting blocks, pieces or elements for these shafts which are to be disassembled to the extent needed outside of the respective roll and frame. That frame is provided with two windows and through one of these windows the rolls will be connected to the drive mechanism; upon disconnection therefrom, the two subassemblies are to be jointly removeable through the respective other window.

In accordance with a particular feature of the invention, it is suggested to provide the pairs of subassemblies as defined so that they can be together lowered within the frame of the roll stand and into a removing position which should be the same for all of the various frames within the tube welding machine. Coupler sleeves provide a universal joint-like connection between the shafts and the roll drive, and upon lowering, the sub-assemblies of these sleeves will be received in particular receiving or holding elements of the frame without disconnection from the drive. A plug-in connection between these sleeves and the shafts permits ready withdrawal from or insertion of the latter into these sleeves. Decisive is that the two subassemblies, each being composed of mounting elements, shaft and roll, can be removed or put back into the stand together. Of particular importance here is the axial locking and connection of the mounting pieces to the stand. For this, it is important to provide a locking mechanism which is easily releaseable and which further permits adjustment of one subassembly axially in relation to the other subassembly because their mutual orientation may have been changed during common insertion into the frame, but both subassemblies, and here particularly the rolls thereof, must be aligned to the rolling and tube shaping axis. For this, one may either lock the two assemblies together in axially adjustable relationship of one to the other and together they are then affixed to the stand in that, for example, the upper one is particularly dependent while the lower one just sits on support blocks and the adjustable axial lock orients one to the other. Alternatively, both of these subassemblies are independently axially locked to the stand, one in an axially adjustable fashion while the upper one sits on the lower one. In the first case, the lower one is temporarily dependent from the upper subassembly during removal and insertion, while a lifting fork holds the upper one. In the second case, the fork engages the lower subassembly.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is an isometric or perspective view of the roll stand and in an operating state shown in FIG. 3;

FIG. 5 is an isometric or perspective view of the two sub-assemblies being suspended in the fork after having been removed from the frame or stand as shown in the preceeding figures;

FIG. 6 is a section view through a modified or alternative version of a roll stand-up assembly, the alternative construction relating particularly to the locking structure;

FIG. 7 is a front view of the alternative version plus additional frame and stand parts, corresponding otherwise to FIG. 2 and indicating by numeral VII the section plane for FIG. 6; and FIG. 8 is a front view similar to FIG. 7 but the subassemblies have been lowered for removal;

Figure 1:
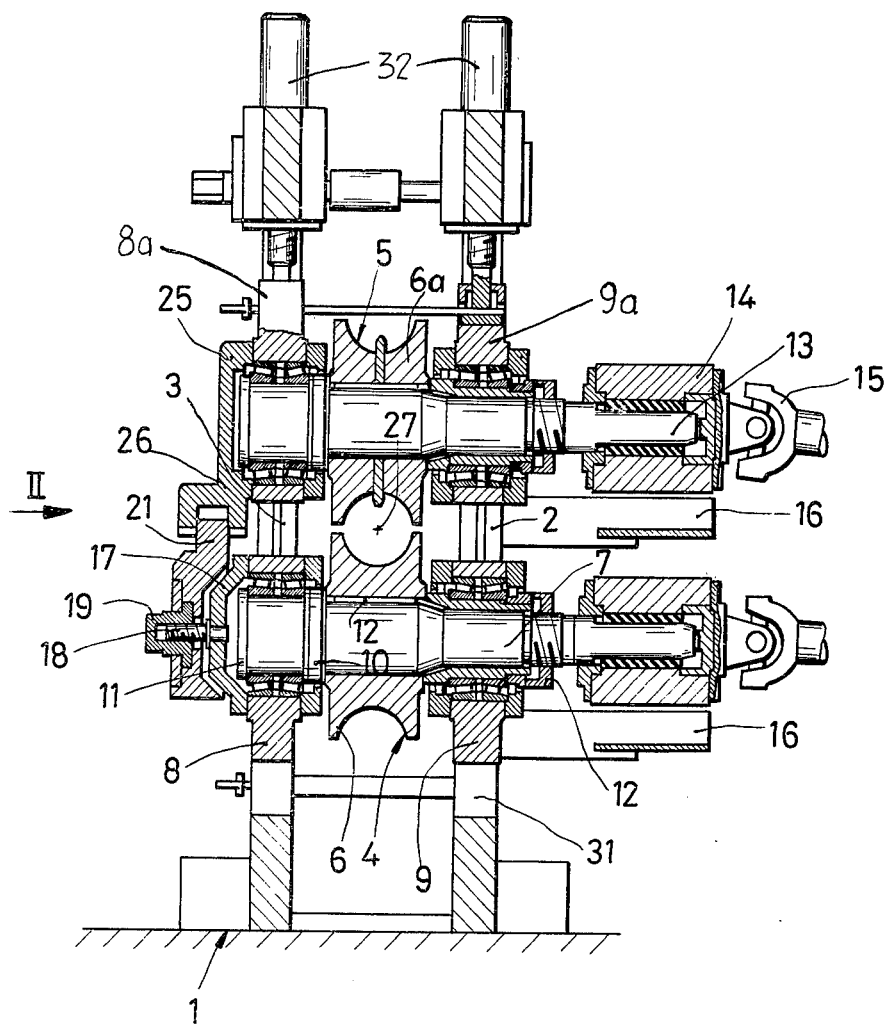
FIG. 1 is a vertical cross-section through a frame and roll stand in a tube welding machine, including two exchangeable sub-assemblies for contour rolls, and further showing locking means and drive.

Proceeding now to the detailed description of the drawings, it is pointed out that a tube welding machine includes a plurality of rolling stands; at least some of them have rolls which are journalled with horizontal axis while other stands have vertically journalled axes. All of the drawings relate to a roll stand with horizontally journalled rolling axes. The roll stand has a frame, such as frame 1 which includes a first lateral window 2 facing the drive means for rolls disposed in the frame while an opposite window 3 does not face such drives. The principle purpose of the frame is to establish the stand for two contour rolls 6 and 6a. These contour rolls are to be particularly placed on an axis 27, being also the center axis of the tube making process.

The two rolls 6 and 6a, respectively, pertain to two subassemblies 4 and 5. Each of these subassemblies includes a roll as stated, a shaft or axle 7 and two positioning, and placement and mounting mebers 8, 8a, and 9, 9a, respectively, for the windows 3 and 2.

Consider one of the shafts 7 whose associated parts are identified more fully and pertain particularly to the lower assembly 4. The shaft 7 is provided with a collar 10 and an end plate 11 to receive between these parts the mounting piece, member or element 8. The mounting element provides particularly for journalling the one shaft end in suitable hearings. The corresponding mounting piece for the upper subassembly 5 is denoted by numeral 8a. The central portion of the shaft 7 is provided with the roll 6 seated on and held on to shaft 7 by means of a spring. Furthermore, shaft 7 is provided with a clamping ring 12 which is threaded and axially positions the other mounting piece, member or element 9 for the shaft. The mounting element 9a is provided for the shaft of the upper subassembly.

The shaft 7 extends beyond the clamping or mounting ring 12 in each instance and is provided with a keying surface 13. This particular shaft portion with keying surface 13 is provided with sufficient play for easy insertion into a coupler sleeve 14, there being an upper and a lower coupler sleeve accordingly. Coupler sleeves 14 are linked to universal joint type shafts 15 and are oriented and stabilized as far as position is concerned by the keying surfaces 13.

Supporting and holding members 16 are provided and connected to frame 1 adjacent to window 2 for receiving the sleeves 14 when the subassemblies 4,5 are removed from the stand. The operation and function of these mounting pieces 16 will be described more fully below.

With the exception of the outer cover for the respective mounting elements 8, 8a the two subassemblies 4 and 5 are quite similar. The cover 17 of the lower mounting piece 8 receives coaxially a welded in, threaded bolt 18 carrying a nut 19. The nut 19 is the center of rotation of a releasable connection for axially locking the two subassemblies 4 and 5 to the frame 1 and to each other. A T-shaped latch or locking element 21 is seated on the nut 19 but is independently rotatable. Turning of the nut 19 on the bolt 18 causes the latch 21 to be displaced axially relative to mounting element 8. On the other hand, latch 21 can be locked to element 8 by means of a pin 20 which is clearly visible FIG. 5.

Figure 2:
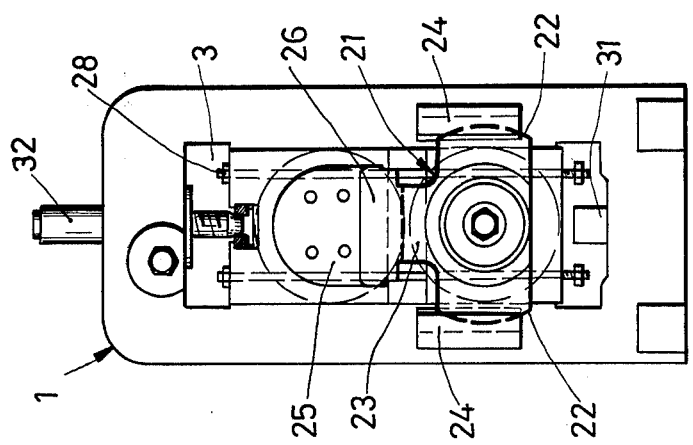
FIG. 2 illustrates a view of the device in accordance with the FIG. 1 and as seen in the direction of the arrow II, but on a somewhat reduced scale.

The two side arms 22 of latch and locking element 21 are longer than the transversely extending stem portion 23 of the T. In order to lock the lower subassembly 4 to the frame 1, legs or arms 22 are received in grooves or pockets 24 being arranged adjacent to frame 3 window, particularly when the subassemblies are in an operating position as shown in FIG. 1 and FIG. 2. At the same time, the stem 23 is inserted in a pocket or groove 26 of a cover 25 which pertains to the mounting piece 8a of the upper subassembly 5. This locks the lower subassembly to the upper subassembly. Turning of the nut 19 on bolt 18 shifts the subassembly 4 relative to the latch and to the upper subassembly in axial direction.

The edges of the pockets 24 have a distance from the axis of rotation of locking member 21 which is larger than the distance of the edge of the pocket 26 to the same axis of rotation. The effect of the different lengths of the arms 22 and of stem 23 in relation to the pockets 24, 26 and their edge-to-axis distance can be seen by comparing FIG. 2 with FIG. 3 and is related to the unlocking of the subassemblies from the frame. As stated, FIG. 2 shows the latch 21 in a position of locking lower subassembly 4 to frame 1 and upper subassembly 5 to lower subassembly 4. In accordance with FIG. 2, the positioning pin 20 was first released whereupon the latch 21 was turned by 90° to the position shown in FIG. 3 so that the leg of stem 23 is positioned adjacent to but not inserted in the left hand pocket 24 while the one arm 22 which was originally disposed in the right hand pocket 24, will now sit in pocket 26 of the upper mounting piece 8. Thus, lower subassembly 4 is no longer latched to frame 1 but is still locked to the upper subassembly 5. This is true, even though the pocket 6 was in this state lifted together with the upper subassembly 5 which will be explained more fully below. The nut 19 has an independent function, namely to axially shift the lower subassembly 4 in relation to the upper subassembly 5 in order to obtain an exact lateral adjustment to the center axis or center line of roll 27. This, however, is an operation which is carried out when the subassemblies are inserted into the frame rather than removed therefrom.

Each of the two pairs vertically aligned mounting elements 8, 8a and mounting elements 9, 9a are in addition penetrated by a pair of differential stroke rods 28. These are rounds or rods having nuts on the irrespective ends. The lower nuts, however, project to such an extent so that in the operating position of the subassemblies the two rods 28 are, in fact, suspended on the upper one 5 without being tensioned. In other words, when the subassemblies are in frame 1, the lower one 4 is not suspended by the rods from the upper one 5.

The mounting pieces 8a, 9a of the upper subassembly 5 are provided with shoulders 29 to engage the prongs of a lifting fork 30. Upon lifting the fork 30 in engagement with shoulder 29 there is a follower connection provided by the lower nuts on rods 28 by means of which the mounting elements of the lower subassembly 4 become suspended from the upper subassembly 5. The mounting pieces 8, 9 of the lower subassembly 4 rest on blocks 31 in the assembled state of the frame. These blocks define the elevational position of the lower subassembly, particularly in relation to the axis 27 of rolling. After the two subassemblies have been lifted by means of the fork 30, the two lower subassembly 4 is thereby lifted off the mounting blocks 31 and now these elements or blocks 31 can be removed.

Again, in the assembled state of the frame, upper subassembly 5 is suspended by and from adjusting spindles 32. Please note that the latch 21 locks the upper subassembly 5 axially in relation to lower subassembly 4 (and, therewith to the axis of rolling). The support for the subassembly 5 is provided by the spindles 32, which also determine the position of that subassembly on the rolling axis. Subassembly 4 just sits on blocks 31 and is adjusted via 18, 19 as described. For purposes of removing the subassemblies from the frame, it is necessary to retain the axial lock between the two subassemblies as described, but to release subassembly 5 from the spindles.

After releasing the follower connection between the adjusting spindles 32 and upper subassembly 5, the fork 30 lowers both subassemblies to establish a dismounting position in which, for example, the roll 6 has a disposition indicated by 6' and at an elevational level H in relation to the axis of rolling 27. This elevational level H is the same for all horizontal roll stands in the tube welding machine. The coupling sleeves 14 are also lowered by this operation and come to rest in the support elements and holders 16 of the frame or stand 1.

Figure 3:
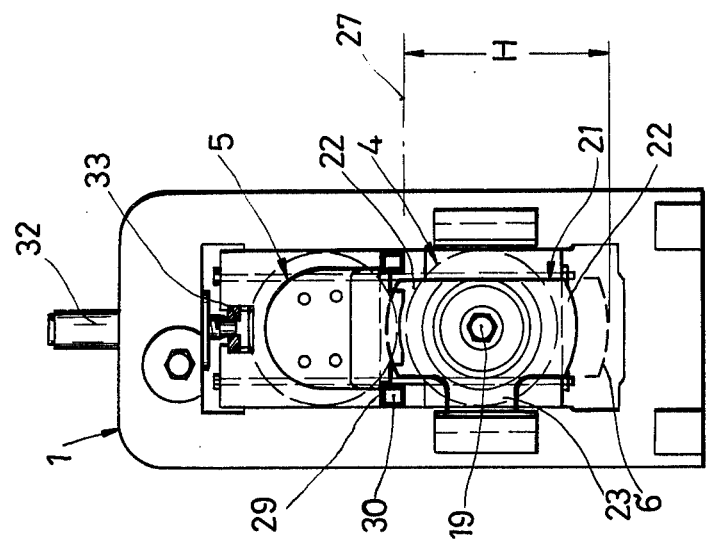
FIG. 3 is a view similar to FIG. 2 but showing the sub-assemblies in an unlocked state and with an inserted load carrying fork.

We now turn to FIG. 5 showing how the C-shaped fork 30 removes both subassemblies, in effect, through the windows 3, i.e. out of the frame 1. Sleeves 14 stay in these cradles or holders 16 while the shafts 7 are pulled out of the sleeves. Whenever, upon reassembly, the flat key surfaces 13 are oriented in the horizontal, reinsertion into the sleeves 14 is very easy indeed. The two subassemblies have previously been axially latched to a position of latch 21 as shown in FIG. 3. after the driving connection has been completed, fork 30 lifts the pair of subassemblies until the hammer head like connections of the upper mounting elements 8a, 9a reestablish connection thereof to the adjusting device 32 by means of the thrust locks 33. Latch 21 is returned to the position shown in FIG. 2. After retracting the fork 30, adjusting spindles 32 are threaded down to such an extent until the lower mounting pieces come to rest again upon the mounting blocks 31 which have been replaced in the meantime. The upper subassembly is subsequently lowered further to be placed into the desired position as far as its roll is concerned also by means of the adjusting spindle 32. The lower nuts or rods 28 disengage during this final phase of the reassembly during which latch arm 23 engages pocket 26. Throughout this procedure the latch 21 retains the axial orientation of the subassemblies 4 and 5 to each other.

Turning now to the embodiment of FIGS. 6, 7 and 8, the lower subassembly 34 thereof corresponds essentially to the subassembly 4 in FIG. 1; however, the releaseable connection of this particular subassembly for axially locking to the frame 35 is differently constructed. A threaded bolt 37 of relatively large diameter is concentrically mounted to a cover 36 of the mounting element 8. An annular disk 39 is threaded (38) onto short bolt 37 and establishes the latch. The latch disk 39 is provided around its circular periphery with a groove 40 which receives on oppositely extending ridges 42 placed alongside of the particular window 41 in the frame. The thread 38 establishes the axial adjustment of the particular lower subassembly 34, in that the disk-shaped latch 39 is turned on the pin or bolt 37.

The axial lock of the upper subassembly, denoted here 44, is not adjustable. Rather the lock is established by a plate 48 which is bolted by means of four bolts to the cover of that particular mounting element of the upper subassembly 44. The plate 48 is provided on opposite vertical edge sides with vertical grooves, and these grooves slide above the upper pair of ridges 42, and into a locking position shown in FIG. 7.

It can thus be seen that the two subassemblies 34, 44 are individually locked axially to the frame, but only one lock permits axial adjustment. Frame 35 in this particular embodiment differs from frame 1 as per FIG. 1, not only by the differently constructed axial locking mechanism, but the adjusting and positioning device 43 differs also in this instance from spindle 32, etc. in type 1 to 5. This difference relates to a difference in the relative connection of the two subassemblies 34 and 44 (other than locking).

The upper subassembly 44 is not suspended from a spindle, but device 43 causes upper subassembly 44 to bear against the lower subassembly 34 by means of resilient legs 45. The subassembly 34, however, rests analogously upon a removeable support block 31. A pressure plate 47 is secured to the spindle of the device 43 to provide the adjustment and positioning of the upper subassembly 44 against the force of the spring legs 45 in order to calibrate the rolling gap to the desired extent. This operating condition of the frame 35 is shown in FIG. 7.

In order to establish a condition which permits the two subassemblies 34 and 44 to be removed, one will again employ the above identified C-shaped fork 30, and the prongs thereof are being placed under the shoulders 46 on the lower side of the lower assembly 34. Lifting of the fork permits removal of the support blocks 31, and after they have been removed, fork 30 lowers the two subassemblies 34 and 44 which remain interconnected by means of the resilient legs 45. The lowered position is illustrated in FIG. 8 and has the same level H in all of the various frames of a tube welding machine, corresponding to FIG. 3.

The removal as per FIG. 8 finds the circular latch 39 and the rectangular latch 48 to be free from the locking elements 42. Recesses of the mounting elements as shown in FIG. 8 permit the subassemblies 34 and 44 to clear the latch elements 42 so that these subassemblies can be removed by the fork, or placed back into the frame through the window 41.

The invention is not limited to the embodiments described above but all changes and modifications thereof not constituting departures from the spirit and scope of the invention are intended to be included.

We claim:

1. In a tube welding machine which includes a plurality of roll stands, including at least one stand for horizontally journalled and contoured rolls, there being drive means disposed adjacent to the stand, having a pair of coupling elements to provide rotational movement, the one stand having a first window adjacent to the drive means and a second window opposite said first window, the improvement for the stand comprising:

universal joint-like driving connections of the drive means to the coupling elements so that the connections can be maintained for different vertical dispositions of the coupling elements;

a pair of shafts each with means for releasable connection to the coupling elements of the pair and permitting disconnection therefrom by axial displacement;

two pairs of mounting elements respectively for journalling the shafts of the pair in horizontal dispositions;

two contoured rolls respectively secured to the shafts;

each shaft with the respective one of the rolls and the respective one of the pairs of mounting elements constituting a disassembleable sub-assembly, there being two sub-assemblies accordingly, the two sub-assemblies being removeable and insertable into the stand through the second windows;

means for establishing elevated positions of the two subassemblies from which the two sub-assemblies can be lowered for concurrent lateral removal through said second window;

holder means adjacent to the first window, and having dispositions corresponding to a lower level for the shafts for the removal, for receiving the coupling elements upon lowering said sub-assemblies, said coupling elements remaining in said holder means upon removal of said sub-assemblies through the second window;

means for interconnecting the two sub-assemblies; and means for releasably axially locking at least one of the mounting elements to the stand adjacent to the second window.

2. The improvement as set forth in claim 1, wherein an upper one of the two sub-assemblies is normally releasably adjustably suspended in the stand, the lower one of the two sub-assemblies resting on support blocks, the means for interconnecting inluding means for suspending the lower sub-assembly from the upper sub-assembly upon release of the upper sub-assembly from the stand.

3. The improvement as in claim 2, the upper subassembly having shoulders for engagement by a lifting fork.

4. The improvement as set forth in claim 1, wherein an upper one of the sub-assemblies sits normally on a lower one of the sub-assemblies by means of vertically yieldable connection means.

5. The improvement as in claim 4, the lower one of the two sub-assemblies having shoulders for engagement by a lifting fork.

6. The improvement as in claim 4, wherein the stand includes means for urging the upper sub-assembly towards the lower sub-assembly for adjustment of the rolling gap.

7. The improvement as in claim 1, the means for axially locking including means for axially stand sub-assembly, two vertically aligned mounting elements pertaining to different ones of the sub-assemblies.

8. The improvement as in claim 7, the means for locking one of the mounting elements including a rotatable T-latch cooperating with latch elements on the stand and on the other one of the two mounting elements being configured to axially lock the one mounting element to the stand and to the other mounting element in one position, and to merely connect the one mounting element to the other mounting element in a second position.

9. The improvement as in claim 8, the one mounting element being axially adjustable in relation to the T-latch.

10. The improvement as in claim 1, wherein the means for locking includes means for locking two mounting elements pertaining to different sub-assemblies separately to the stand, the means for locking one of the latter mounting elements includes axially adjustable means.

* * * * *